(12) United States Patent
Anderson et al.

(10) Patent No.: US 9,256,745 B2
(45) Date of Patent: Feb. 9, 2016

(54) PROTECTING OPERATING SYSTEM CONFIGURATION VALUES USING A POLICY IDENTIFYING OPERATING SYSTEM CONFIGURATION SETTINGS

(75) Inventors: Scott D. Anderson, Seattle, WA (US); David J. Linsley, Seattle, WA (US); Magnus Bo Gustaf Nyström, Sammamish, WA (US); Douglas M. MacIver, Seattle, WA (US); Robert Karl Spiger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 812 days.

(21) Appl. No.: 13/037,962

(22) Filed: Mar. 1, 2011

(65) Prior Publication Data

US 2012/0226895 A1    Sep. 6, 2012

(51) Int. Cl.
*G06F 9/00* (2006.01)
*G06F 15/177* (2006.01)
*G06F 21/57* (2013.01)

(52) U.S. Cl.
CPC .................................. *G06F 21/575* (2013.01)

(58) Field of Classification Search
CPC ..................................................... G06F 21/575
USPC ............................................................. 713/2
See application file for complete search history.

(56) References Cited

U.S. PATENT DOCUMENTS

| 6,792,556 | B1 |  | 9/2004 | Dennis |  |
|---|---|---|---|---|---|
| 6,941,355 | B1 |  | 9/2005 | Donaghey et al. |  |
| 7,546,448 | B2 | * | 6/2009 | Dickens et al. | 713/1 |
| 7,631,175 | B2 | * | 12/2009 | Dickens et al. | 713/1 |
| 7,805,598 | B2 |  | 9/2010 | Dandekar et al. |  |
| 7,822,960 | B2 |  | 10/2010 | Zimmer et al. |  |
| 7,836,309 | B2 |  | 11/2010 | Holt et al. |  |
| 8,185,727 | B2 | * | 5/2012 | Joshi et al. | 713/1 |
| 2003/0061494 | A1 |  | 3/2003 | Girard et al. |  |
| 2004/0003288 | A1 |  | 1/2004 | Wiseman et al. |  |
| 2004/0128495 | A1 | * | 7/2004 | Hensley | 713/2 |
| 2004/0255106 | A1 |  | 12/2004 | Rothman et al. |  |

(Continued)

FOREIGN PATENT DOCUMENTS

| CN | 1308283 | 8/2001 |
|---|---|---|
| CN | 1678968 | 10/2005 |

OTHER PUBLICATIONS

"UEFI Boot Manager", Retrieved at <<http://software.intel.com/en-us/articles/uefi-boot-manager/>>, Jan. 2, 2008, pp. 3.

(Continued)

*Primary Examiner* — Mohammed Rehman
(74) *Attorney, Agent, or Firm* — Timothy Churna; Kate Drakos; Micky Minhas

(57) ABSTRACT

In a pre-operating system environment on a device prior to loading and running an operating system on the device, a policy identifying configuration settings for the operating system is obtained. The operating system itself is prevented from changing this policy, but the policy can be changed under certain circumstances by components of the pre-operating system environment. The policy is compared to configuration values used by the operating system, and the operating system is allowed to boot with the configuration values if the configuration values satisfy the policy. However, if the configuration values do not satisfy the policy, then a responsive action is taken.

26 Claims, 5 Drawing Sheets

(56) References Cited

U.S. PATENT DOCUMENTS

| | | | |
|---|---|---|---|
| 2005/0108530 A1* | 5/2005 | Tonegawa | H04L 12/58 713/170 |
| 2005/0114687 A1 | 5/2005 | Zimmer et al. | |
| 2005/0198487 A1 | 9/2005 | Zimmer et al. | |
| 2007/0235517 A1* | 10/2007 | O∝Connor et al. | 235/375 |
| 2008/0082811 A1 | 4/2008 | Davis et al. | |
| 2008/0091929 A1* | 4/2008 | Oberhaus et al. | 713/1 |
| 2008/0155331 A1 | 6/2008 | Rothman et al. | |
| 2009/0172471 A1* | 7/2009 | Zimmer et al. | 714/17 |
| 2009/0271606 A1* | 10/2009 | Sugano | 713/2 |
| 2009/0327741 A1 | 12/2009 | Zimmer et al. | |
| 2010/0011238 A1* | 1/2010 | Nakamura | G06F 11/1458 714/5.1 |
| 2010/0146251 A1* | 6/2010 | Lo et al. | 713/1 |
| 2010/0169633 A1 | 7/2010 | Zimmer et al. | |
| 2010/0217846 A1* | 8/2010 | Styles | G06F 21/575 709/221 |
| 2010/0303240 A1 | 12/2010 | Beachem et al. | |
| 2011/0066783 A1* | 3/2011 | Konireddygari et al. | 710/269 |
| 2011/0107430 A1* | 5/2011 | Graham et al. | 726/27 |
| 2011/0271268 A1* | 11/2011 | Dang | 717/168 |

OTHER PUBLICATIONS

"Security Overview", Retrieved at <<http://www.chromium.org/chromium-os/chromiumos-design-docs/security-overview>>, Retrieved Date: Jan. 7, 2011, pp. 9.

"Saving the Current Configuration—", Retrieved at <<http://www.juniper.net/techpubs/software/erx/erx50x/swconfig-system-basics/html/system-mgmt8.html>>, Retrieved Date: Jan. 7, 2011, pp. 5.

"International Search Report", Mailed Date: Sep. 25, 2012, Application No. PCT/US2012/027302, Filed Date: Mar. 1, 2012, pp. 9.

"Extended European Search Report", EP Application No. 1275104.5, Jul. 7, 2014, 6 pages.

"TCG EFI Platform Specification", Available at: http://www.trustedcomputinggroup.org/files/temp/644EE853-1D09-3519-ADB133C09A5F2BDF/TCG%20EFI%20Platform%20Specification.pdf, Jun. 7, 2006, 38 pages.

"Foreign Office Action", CN Application No. 201210051206.8, Nov. 3, 2015, 18 pages.

\* cited by examiner

500

PROTECTING OPERATING SYSTEM CONFIGURATION VALUES USING A POLICY IDENTIFYING OPERATING SYSTEM CONFIGURATION SETTINGS

BACKGROUND

Computers have become increasingly interconnected via various networks, such as the Internet. While such connectivity allows users to access a variety of different services and data, such connectivity is not without its problems. One such problem is that such connectivity can allow malicious programs to be run on these computers. These malicious programs can perform a variety of undesirable actions, such as launching attacks against other computers, sending private data to other users' computers, preventing a user from being able to use his or her computer, and so forth. It remains difficult to protect computers against such malicious programs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a pre-operating system environment on a device prior to loading and running an operating system on the device, a policy identifying configuration settings for at least one operating system is obtained. The operating system is prevented from changing this policy. This policy is compared to configuration values used by the operating system, and the operating system is allowed to boot with the configuration values if the configuration values satisfy the policy. However, if the configuration values do not satisfy the policy, then a responsive action is taken.

In accordance with one or more aspects, a change to a policy identifying configuration settings that are to be satisfied by configuration values of the operating system in order for the operating system to be executed on the device is received. The operating system itself is prevented from changing this policy. A check is made as to whether the change to the policy is approved by an entity trusted by a pre-operating system environment, and the policy is changed only if the change to the policy is approved by the pre-operating system environment.

BRIEF DESCRIPTION OF THE DRAWINGS

The same numbers are used throughout the drawings to reference like features.

DETAILED DESCRIPTION

Figure 1:
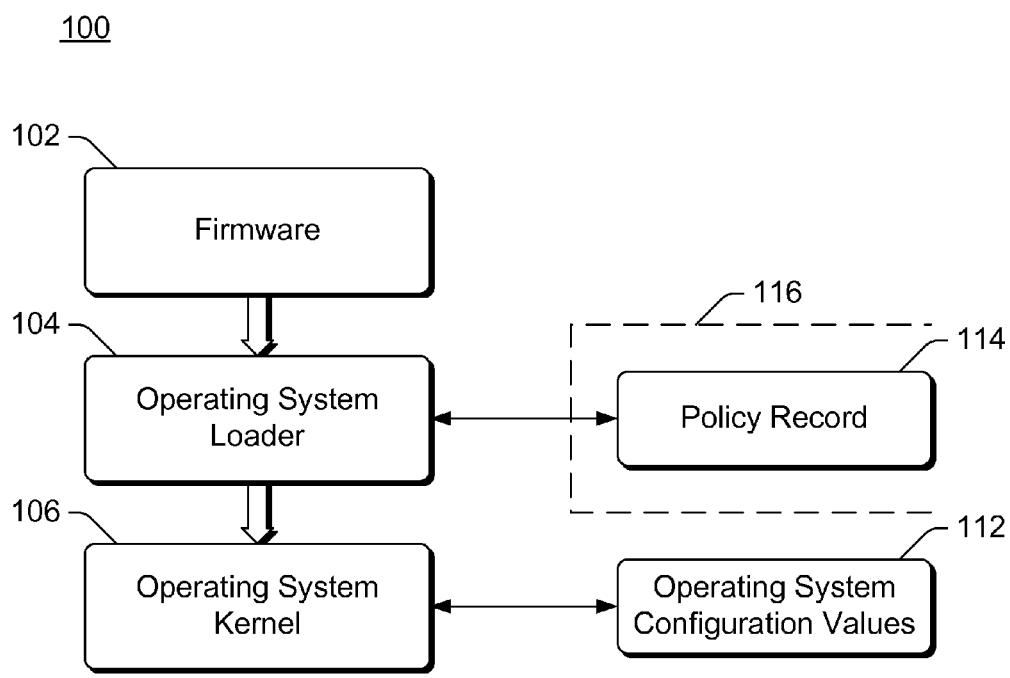
FIG. 1 illustrates an example device implementing the protecting operating system configuration values in accordance with one or more embodiments.

Protecting operating system configuration values is discussed herein. During a process of booting a device, a set of configuration values used by at least part of one or more operating systems of the device, and optionally including one or more configuration values used by components of a pre-operating system environment of the device, is checked against a policy for the device. If the configuration values satisfy the policy, then the operating system is permitted to run on the device, but if the configuration values do not satisfy the policy then one or more appropriate actions are taken (e.g., not running the operating system, changing the values, etc.). The policy is stored in a manner protecting against unauthorized modification by the operating system and other applications running on the computing device. However, one or more policy issuers can update the policy, allowing the policy to change over time.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

FIG. 1 illustrates an example device 100 implementing the protecting operating system configuration values in accordance with one or more embodiments. Device 100 includes firmware 102, operating system loader 104, and operating system kernel 106, each of which is one or more components or modules that allow device 100 to perform various operations. These components or modules include instructions and/or data that is typically stored in a nonvolatile memory or storage device (e.g., Flash memory, read only memory (ROM), magnetic disk, optical disc, remote device or storage accessed over a network, and so forth). These components or modules are loaded from the nonvolatile memory or storage device into one or more volatile memories (e.g., random access memory (RAM)) from which they are retrieved and executed by one or more processors.

When device 100 is powered on or otherwise reset, device 100 boots. Booting of device 100 refers to the beginning operation of device 100, typically loading and executing an operating system of device 100. The booting of device 100 typically includes at least two stages. In the first stage, components of a pre-operating system environment are loaded and run on device 100. In the pre-operating system environment, various components or modules run performing various operations including booting the operating system. In the second stage, components of the operating system environment are loaded and run on device 100. In the operating system environment, the operating system is running on device. 100.

Loading of a component refers to copying the component into a volatile (or alternatively nonvolatile) memory, and optionally performing additional configurations to other components or data stores. Executing a component refers to the running of (execution of) the instructions of the component by a processor or controller of device 100. After device 100 is booted, various other programs can be run on device 100 by the operating system.

Device 100 can be a variety of different types of physical devices. For example, device 100 can be a desktop computer, a laptop or netbook computer, a notepad or tablet computer, a mobile station, an entertainment appliance, a set-top box communicatively coupled to a display device, a television, a cellular or other wireless phone, a game console, an automotive computer, and so forth. Device 100 can also be a virtual device, such as a virtual machine running on a physical device. A virtual machine can be run on any of a variety of different types of physical devices.

During the boot process, firmware 102 is loaded and executed by device 100. Firmware 102 is stored in a nonvolatile memory of device 100. Firmware 102 can be stored in a read only memory, or alternatively in writeable nonvolatile memory (such as Flash memory). In embodiments in which firmware 102 is stored in writeable nonvolatile memory, care is typically taken to ensure that such firmware 102 is not tampered with (and thus not altered by a malicious program). Such care can be taken, for example, by verifying a signature on the firmware 102 stored in writeable nonvolatile memory, storing firmware 102 in protected memory that is accessible only to firmware 102, using a variety of conventional trusted boot or secure boot techniques, and so forth.

Firmware 102 initiates execution of operating system loader 104. Operating system loader 104 is typically loaded and verified by firmware 102 before being executed. Operating system loader 104 can be verified in different manners, such as by verifying a digital signature (generated by an entity that firmware 102 is configured (e.g., programmed) to trust) of operating system loader 104.

Operating system loader 104 loads and executes operating system kernel 106. Operating system kernel 106 is typically loaded and verified by operating system loader 104 before being executed. Operating system kernel 106 can be verified in different manners, such as by verifying a digital signature (generated by an entity that operating system loader 104 is configured (e.g., programmed) to trust) of operating system kernel 106. Operating system kernel 106 can then proceed to load and execute a variety of different operating system components and/or user mode components. These operating system components and user mode components can be executed in response to a user request to execute such a component or in response to a request from another component or module.

Operating system kernel 106 obtains and operates in accordance with various operating system configuration values 112. Although illustrated as being accessed by operating system kernel 106, operating system configuration values 112 can also be accessed by operating system loader 104, and/or other components or modules of device 100. Operating system configuration values 112 can be any of a variety of different information that is used to determine how operating system kernel 106 (and/or operating system loader 104) is to operate, what components of operating system kernel 106 (and/or operating system loader 104) are to be loaded and executed, combinations thereof, and so forth. For example, operating system configuration values 112 can be an indication of whether operating system kernel 106 (and/or operating system loader 104) is to permit untrusted programs or components to execute on device 100 or whether operating system kernel 106 (and/or operating system loader 104) is to authenticate programs or components before running on device 100. By way of another example, operating system configuration values 112 can be an indication of whether an anti-malware application (or a particular anti-malware application) is to be run on device 100. By way of another example, operating system configuration values 112 can be an indication of configuration values or settings to be used for a virtual machine manager that manages virtual machines running on device 100. By way of yet another example, operating system configuration values 112 can be an indication of particular processor or processor core settings to be used (e.g., areas of memory that are to be marked as non-executable).

In one or more embodiments, firmware 102 and operating system loader 104 are implemented as part of a pre-execution environment (also referred to as a pre-boot environment or pre-operating system environment), which refers to an environment running on device 100 before the operating system has finished booting and is running. In such embodiments, firmware 102 and operating system loader 104 can be stored on a component of device 100 (e.g., in read only memory (ROM) or flash memory), such as on a network interface card of device 100. Alternatively, firmware 102 and operating system loader 104 can be obtained from another device or service during the pre-execution environment. For example, firmware 102 and operating system loader 104 can be included as part of a boot image provided to the device 100 from another device or service.

The pre-execution environment can be implemented in a variety of different manners and can be based on a variety of different conventional techniques. For example, the pre-execution environment can be implemented in accordance with the Preboot eXecution Environment (PXE) standard version 2.0 or other versions. By way of another example, the pre-execution environment can be implemented in accordance with the Unified Extensible Firmware Interface (UEFI) standard version 2.3 or other versions. By way of yet another example, the pre-execution environment can be implemented using a variety of different personal computer basic input/output system (BIOS) versions.

During the boot process, operating system loader 104 obtains policy record 114, which is a record of one or more policies to which device 100 is to conform. This record of policies includes configuration settings or values that operating system configuration values 112 are to satisfy. Operating system loader 104 compares the one or more policies in policy record 114 to operating system configuration values 112, and proceeds with initiating execution of operating system kernel 106 components if operating system configuration values 112 satisfy the one or more policies in policy record 114. However, if one or more operating system configuration values 112 do not satisfy a policy in policy record 114 then an appropriate responsive action is taken. A variety of different responsive actions can be taken, such as not loading operating system kernel 106, changing an operating system configuration value 112, and so forth. These responsive actions are discussed in more detail below. Operating system loader 104 thus protects operating system configuration values 112, identifying situations in which operating system configuration values 112 may have been changed by a malicious program.

In one or more embodiments the one or more policies in policy record 114 also include configuration settings or values that one or more components of a pre-operating system environment of the device are to satisfy. These configuration settings or values to be satisfied by the pre-operating system environment can be any of a variety of different indications of how the pre-operating system environment is to operate, what components of the pre-operating system environment are to be loaded and executed, combinations thereof, and so forth. These configuration settings or values can be included as part of operating system configuration values 112, or alternatively can be other settings or values. For example, these configuration settings or values can specify that only a particular operating system is to be loaded and executed.

Although a single operating system kernel 106 is illustrated in FIG. 1, it should be noted that alternatively multiple different operating system kernels 106 can be loaded and executed on device 100. Each of these different operating system kernels can have its own operating system configuration values 112 and its own policy record 114 (or its own policies within policy record 114), and operating system loader 104 compares the appropriate one or more policies to the appropriate operating system configuration values for the operating system kernel 106 being booted. Alternatively, two or more of these different operating system kernels can share at least part of operating system configuration values 112 and/or policy record 114 (and/or policies within policy record 114).

Figure 2:
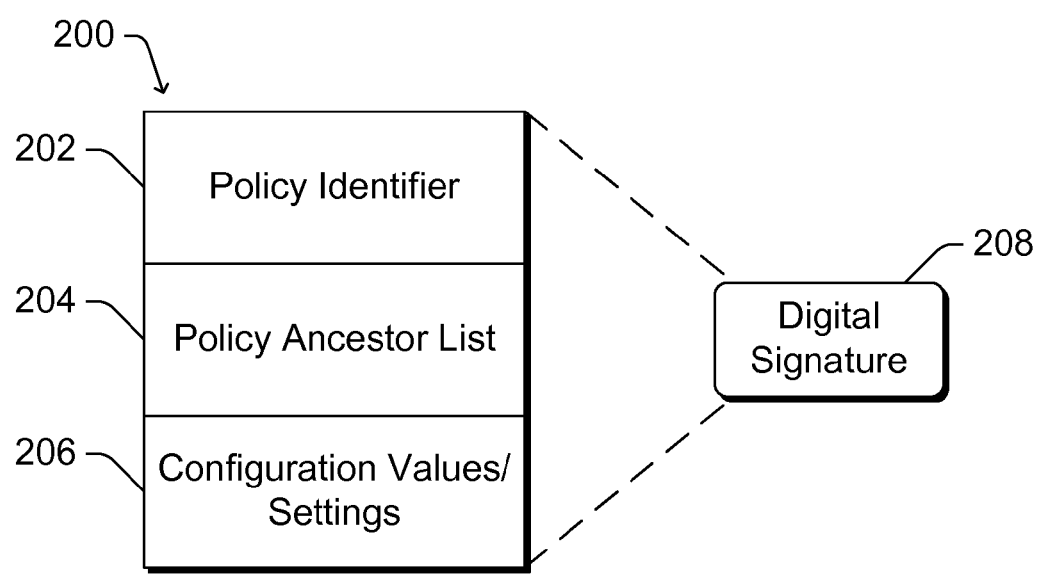
FIG. 2 illustrates an example policy in accordance with one or more embodiments.

FIG. 2 illustrates an example policy 200 in accordance with one or more embodiments. Policy 200 can be included, for example, as a policy in policy record 114 of FIG. 1. Policy 200 includes a policy identifier 202, a policy ancestor list 204, and one or more configuration values and/or settings 206. A digital signature 208 over policy 200 is also generated by digitally signing one or more of policy identifier 202, policy ancestor list 204, and configuration values/settings 206.

Policy identifier 202 identifies policy 200, allowing different policies to be distinguished from one another. Policy identifier 202 can be, for example, a globally unique ID (GUID) assigned to policy 200. Policy ancestor list 204 is a list of zero or more other policies which policy 200 replaces. Policy ancestor list 204 facilitates preventing certain types of attacks, as discussed in more detail below.

Configuration values and/or settings 206 include the values that the operating system configuration values (e.g., values 112 of FIG. 1) are to satisfy. Configuration values and/or settings 206 can also include the responsive action to take if one or more of the configuration values in policy 200 are not satisfied by the operating system configuration values. One or more of the configuration values and/or settings 206 can optionally be set by an operating system loader component, as discussed in more detail below.

Configuration values and/or settings 206 can also include references to identifiers of one or more other policies. The configuration values and/or setting in these one or more other policies are included as part of policy 200. Thus, a policy 200 can effectively incorporate or include one or more other policies. Configuration values and/or settings 206 can also include identifiers of one or more trusted policy issuers. Thus, a new policy issuer that is allowed to add policies to the policy record (e.g., policy record 114 of FIG. 1) can be identified in policy 200.

Returning to FIG. 1, operating system loader 104 checks whether operating system configuration values 112 satisfy the one or more policies in policy record 114. Policy record 114 can include a single policy, which can be changed by one or more different policy issuers as discussed in more detail below. Alternatively, policy record 114 can include multiple policies, each of which can be changed by one or more policy issuers. Accordingly, different policy issuers can, for example, provide different policies (that they can subsequently change) for inclusion in policy record 114.

The configuration values can be identified in the policies in a variety of different manners. In one or more embodiments, policies identify values in name-value pairs, including a name (or other identifier) of an operating system configuration value and one or more values that that operating system configuration value is to have in order to satisfy the policy. In other embodiments, values are included in a policy in an ordering or other structure in which the corresponding operating system configuration values are inherent.

The determination of whether operating system configuration values 112 satisfy the one or more policies in policy record 114 can be performed in different manners. In one or more embodiments, a mathematical operator is used to determine whether an operating system configuration value satisfies a policy. A variety of different mathematical operators can be used, such as equals, greater than, less than, and so forth. In other embodiments other operators or logical formulas are used to determine whether an operating system configuration value satisfies a policy, such as whether the operating system configuration value is included as one of a set of values in the policy.

In situations in which multiple policies are included in policy record 114, the determination of whether operating system configuration values 112 satisfy the policies in policy record 114 is a determination of whether operating system configuration values 112 satisfy each of the multiple polices in policy record 114. Thus, the multiple policies can be viewed as being combined for purposes of determining whether operating system configuration values 112 satisfy the policies in policy record 114.

If operating system configuration values 112 satisfy policy record 114, then operating system loader 104 proceeds with initiating execution of operating system kernel 106. However, if one or more operating system configuration values 112 do not satisfy policy record 114 then an appropriate action in response to the one or more operating system configuration values 112 not satisfying policy record 114 is taken. Different responsive actions can be taken for different operating system configuration values, or the same responsive action can be taken for multiple operating system configuration values. These responsive actions can include actions that stop the boot process so that the operating system is not loaded and run on device 100, as well as actions that allow the boot process to continue so that the operating system is loaded and run on device 100.

In one or more embodiments, the responsive action to be taken is included in policy record 114. Each policy in policy record 114 can include an indication (e.g., as part of configuration values/settings 206 of FIG. 2) of the responsive action to be taken if at least part of the policy is not satisfied (e.g., a particular operating system configuration value 112 does not satisfy the policy). In other embodiments, the responsive action to be taken is included in (e.g., programmed in or set as a configuration value) or otherwise obtained by operating system loader 104.

The responsive action can be to stop the boot process—operating system loader 104 does not initiate execution of operating system kernel 106 so the operating system is not loaded and run on device 100. The responsive action can alternatively be to ignore the operating system configuration value 112 that does not satisfy the policy and use another value (e.g., included in the policy) instead. The responsive action can alternatively be to overwrite the operating system configuration value 112 with the value from (or otherwise identified by) the policy, and allow the boot process to continue. The responsive action can alternatively be to use the operating system configuration value 112 and allow the boot process to continue, but report an event, such as record or send (e.g., to another component, device, or service) a notification that the operating system configuration value 112 did not satisfy the policy (an indication of the particular operating system configuration value and/or policy can be included in the notification).

The responsive action can alternatively be to prompt a user of device 100 (e.g., to receive user approval to proceed with the boot process). This prompting can include, for example, a prompt requesting the user to approve of a current operating system configuration value. This prompting can also include an indication of what the configuration value should be in order to satisfy the policy. The user can then provide a variety of different inputs to approve (or disapprove) proceeding with the current operating system configuration value, such as pressing a button or key, touching a particular portion of a screen, providing an audible input, providing a security token that is trusted (or can be verified by) operating system loader 104, and so forth. Operating system loader 104 takes care to verify that the input is received from a user of device 100 (e.g., received from a keyboard, touchscreen, microphone, etc. of device 100) rather than a remote device (e.g., verifies that the user input is received from a key press or local microphone rather than a request received from a remote device). Thus, in such situations, the boot process can continue only if a user is present at device 100 and approves of continuing the boot process—a malicious device or a malicious component of device 100 cannot approve of continuing the boot process.

Policy record 114 is maintained in a secure manner in which operating system loader 104 can change policy record 114 but that components executed after operating system loader 104 (in particular operating system kernel 106 as well as other operating system components and/or user mode components) are prevented from changing policy record 114. Policy record 114 is illustrated as surrounded by a dashed line 116 to reflect this security. Policy record 114 can be maintained in this secure manner in a variety of different manners.

In one or more embodiments, policy record 114 is stored in a writeable nonvolatile memory, such as nonvolatile random access memory (NVRAM). The writeable NVRAM can be accessed only under certain conditions and/or at certain times. In one or more embodiments, the writeable NVRAM is accessed via a Trusted Platform Module (TPM). Additional information regarding TPM is available from the Trusted Computing Group of Beaverton, Oreg. The TPM allows the writeable NVRAM to be read from and written to until a certain point in time or a certain event occurs, after which the TPM allows the writeable NVRAM to be read but not written. This certain point in time or event can be, for example, a request from a component to close or lock the writeable NVRAM. Accordingly, operating system loader 104 can make changes to policy record 114 in the writeable NVRAM and then have the writeable NVRAM locked. Operating system loader 104 can thus prevent a malicious program from tampering with policy record 114 because the writeable NVRAM is locked. The writeable NVRAM is not unlocked until device 100 is booted again. The writeable NVRAM is unlocked the next time device 100 is booted, but operating system loader 104 locks the writeable NVRAM again before a malicious program would be able to execute and write to the writeable NVRAM. Similarly, other types of storage devices (e.g., magnetic disk drives) can be implemented so as to be accessed only under certain conditions and/or at certain times.

Alternatively, policy record 114 can be maintained in a secure manner using other techniques, such as by policy record 114 being accessible only through a protected interface (e.g., an application programming interface (API)) that permits changes to policy record 114 only if the change is signed by a trusted entity. Such a trusted entity is an entity that is trusted by operating system loader 104 (e.g., an entity that is known by operating system loader 104 as being trustworthy and for which operating system loader 104 has a public key). For example, policy record 114 can be stored as a UEFI authenticated variable, which can be changed only if the change is signed by a trusted entity. Any requested changes to policy record 114 are verified as being signed by a trusted entity, and such requested changes are made if signed by a trusted entity but are not made if not signed by a trusted entity.

By way of another example, in situations in which device 100 is implemented as a virtual machine, policy record 114 can be maintained in a secure manner by a virtual machine manager that manages operation of one or more virtual machines on a device. The virtual machine manager can permit operating system loader 104, but not other components, to change the policies in policy record 114.

Changes to policy record 114 include adding policies to policy record 114, removing policies from policy record 114, and/or replacing policies in policy record 114 with new policies. In one or more embodiments, changes to policy record 114 are performed by operating system loader 104 if such changes are received from a trusted policy issuer (e.g., the changes are digitally signed by a policy issuer entity that is trusted by operating system loader 104). Requests to change policies in policy record 114 can be provided to operating system loader 104 in different manners. In one or more embodiments, operating system kernel 106 or another component running on device 100 stores the change to the policy in a persistent location that is accessible to operating system loader 104 on the next boot of device 100. On the next boot of device 100, operating system loader 104 obtains the change and implements the change if appropriate. The operating system kernel 106 or other component running on device 100 can also store a request for a particular type of change along with the change (e.g., an indication that a particular policy is to be removed or is to replace another policy). Alternatively, the request for a particular type of change can be inherent (e.g., the presence of a saved policy in the persistent location is deemed by operating system loader 104 as a request to add that policy to policy record 114).

Operating system loader 104 can remove a policy from policy record 114 in response to a request (from a policy issuer) to remove the policy. Operating system loader 104 verifies that the request is from a policy issuer that is a trusted entity, then removes the policy if the request is from a policy issuer that is a trusted entity and does not remove the policy if the request is not from a policy issuer that is a trusted entity.

Similarly, operating system loader 104 can add a new policy to policy record 114 in response to a request (from a policy issuer) to add the policy. Operating system loader 104 verifies that the new policy (and optionally the request) is from a policy issuer that is a trusted entity, and adds the new policy if the new policy (and optionally the request) is from a policy issuer that is a trusted entity but does not add the new policy if the new policy (and/or optionally the request) is not from a policy issuer that is a trusted entity.

Additionally, operating system loader 104 can replace a policy in policy record 114 (also referred to as the current version of the policy) with a new policy (also referred to as the new version of the policy). When a new policy is received operating system loader 104 verifies that the new policy (and optionally the request) is from a policy issuer that is a trusted entity. If the new policy (and/or optionally the request) is not from a policy issuer that is a trusted entity then operating system loader 104 does not replace the current version of the policy with the new version of the policy.

However, if the new policy (and optionally the request) is from a policy issuer that is a trusted entity, then operating system loader 104 checks whether the new version of the policy is indeed a newer version of the current version of the policy. Operating system loader 104 can check whether the new version of the policy is indeed a newer version of the current version of the policy by checking whether the current version of the policy is included in an ancestor list of the new version of the policy. The new version of the policy includes a policy ancestor list that identifies zero or more previous policies issued by that same policy issuer that are replaced by the new version of the policy. The policy ancestor list can identify previous policies by their policy identifiers (e.g., GUIDs). If the new version of the policy is from a policy issuer that is a trusted entity, and the current version of the policy is included in the policy ancestor list of the new version of the policy, then operating system loader 104 replaces the current version of the policy with the new version of the policy. Otherwise, operating system loader 104 does not replace the current version of the policy with the new version of the policy.

It should be noted that use of the policy ancestor list facilitates protecting against rollback or replay attacks by a malicious program or user. For example, a malicious program or user may attempt to replace the current version of a policy (e.g., that includes new security-related values or settings) with an older version of the policy (e.g., that included outdated security-related values or settings that would allow the malicious program or user to gain inappropriate access to components of device 100). By replacing the current version of the policy with the new policy only if the current version of the policy is included in the policy ancestor list of the new version of the policy, operating system loader 104 ensures that the current version of the policy is not replaced by an older version of the policy. Even though an older version of the policy may have been made available by a policy issuer that is a trusted entity, the older version of the policy would not have an ancestor list that includes the current version of the policy, and thus operating system loader 104 would not replace the current version of the policy with the older version of the policy.

Additionally, in one or more embodiments changes to policy record 114 are performed by operating system loader 104 only if such changes are approved by an entity trusted by the pre-operating system environment (e.g., trusted by operating system loader 104 and/or firmware 102), such as a user of device 100 or other trusted entity. When the entity is a user of device 100, operating system loader 104 prompts the user of device 100 for approval of the change, such as by displaying a visual prompt on a screen of (or coupled to) device 100, playing back an audible prompt on a speaker of (or coupled to) device 100, and so forth. The user can approve the change to the policy by providing a variety of different inputs, such as pressing a button or key, touching a particular portion of a screen, providing an audible input, and so forth. Operating system loader 104 takes care to verify that the input is received from a user of device 100 (e.g., received from a keyboard, touchscreen, microphone, etc. of device 100) rather than a remote device (e.g., verifies that the user input is received from a key press or local microphone rather than a request received from a remote device). Thus, in such situations, changes to policy record 114 can be performed only if a user is present at device 100 and approves of the changes—a malicious device or a malicious component of device 100 cannot approve of such changes.

When the entity is another entity trusted by the pre-operating system environment (other than a user), the changes to policy record 114 are digitally signed by the entity. Operating system loader 104 verifies the digital signature and performs the changes to policy record 114 only if the digital signature is verified as being from an entity trusted by the pre-operating system environment (e.g., trusted by operating system loader 104). If the digital signature is not verified then the changes to policy record 114 are not made.

In one or more embodiments, policies in policy record 114 have an associated timestamp (e.g., date and time). The timestamp associated with a policy can be included as part of the policy, or alternatively can be maintained separately. For example, a separate record of policy identifiers and timestamps can be maintained by operating system loader 104, and this record is maintained in a secure manner (e.g., in a variety of different secure manners analogous to those discussed above regarding policies in policy record 114 being maintained in a secure manner).

Operating system loader 104 can use these timestamps in determining whether to change policy record 114 (e.g., in determining whether a new version of the policy is indeed a newer version of the current version of the policy). A policy issuer can intend to replace one version of a policy with a new version of that policy, using the same policy identifier for both versions of the policy but different timestamps. Operating system loader 104 checks whether the new version of the policy (and optionally the request to change the policy) is from a policy issuer that is a trusted entity, and whether the new version of the policy has a more recent timestamp than the current version of the policy. If the new version of the policy is from a policy issuer that is a trusted entity, and the current version of the policy has a more recent timestamp than the current version of the policy, then operating system loader 104 replaces the current version of the policy with the new version of the policy. Otherwise, operating system loader 104 does not replace the current version of the policy with the new version of the policy. As the current version of the policy and the new version of the policy have the same policy identifier, the determination of whether to replace the current version of the policy with the new version of the policy is based on the timestamps of the versions of the policy rather than an ancestor list of the new version of the policy.

Similarly, policies in policy record 114 can have an associated version number that is assigned by the policy issuer. The version number of a policy is incremented (or a next version number in a set is selected) for each new version of the policy. Version numbers can be used analogously to timestamps, but are numbers (and/or other characters) other than timestamps.

Alternatively, operating system loader 104 need not use timestamps and/or version numbers in determining whether to change policy record 114. In such situations, if a policy issuer intends to replace one version of a policy with a new version of that policy, the policy issuer uses different policy identifiers for the two versions of the policy, and includes the policy identifier of the version of the policy to be replaced in the ancestor list of the new version of the policy.

In one or more embodiments, changes to policy record 114 also include values written by an operating system loader 104 during the boot process. For particular configuration settings in a policy, operating system loader 104 captures one or more current values or settings in device 100 during the boot process. These captured values or settings are saved as part of (or otherwise associated with) the policy and treated as part of the policy to be satisfied on subsequent boots of device 100. Accordingly, operating system loader 104 verifies that, on subsequent boots of device 100, these captured settings or values are satisfied by operating system configuration values 112.

Which settings are to have their current values or settings captured during a boot process can be identified in different manners. For example, a policy can include a setting indicating that a particular value is to be captured and saved by operating system loader 104 during the boot process. By way of another example, operating system loader 104 can be configured with (e.g., programmed with) or otherwise obtain indications of which particular values are to be captured and saved by operating system loader 104 during the boot process. By way of another example, operating system loader 104 can detect when security of device 100 gets stronger or improves (e.g., when an anti-malware program is installed, when a firewall program is installed, etc.), and capture and save a value or setting associated with that stronger or improved security (e.g., capture and save an indication of the anti-malware program).

As device 100 can be booted multiple times, which one of those multiple boot processes is the boot process during which the values are to be captured and saved can be identified in different manners. The values can be captured and saved during the first time device 100 is booted without the value having already been captured and saved (or if no values are found to have been already captured and saved). Alternatively, operating system loader 104 can be configured with (e.g., programmed with) or otherwise obtain indications of on which boot of device 100 the values are to be captured and saved. Alternatively, a policy in policy record 114 can include an indication of on which boot of device 100 the values are to be captured and saved.

Alternatively, a user input can be received that indicates to operating system loader 104 that the values are to be captured and saved (e.g., during the current boot process or on the next boot of device 100). The user input can be provided in different manners, such as by the user pressing a button or key, touching a particular portion of a screen, providing an audible input, and so forth. Operating system loader 104 takes care to verify that the input is received from a user of device 100 rather than a remote device (e.g., verifies that the user input is received from a key press or local microphone rather than a request received from a remote device). Thus, in such situations, a request to capture and save the values can be performed only if a user is present at device 100 and approves of such capture and saving—a malicious device or a malicious component of device 100 cannot approve the capture and saving of such values.

Figure 3:
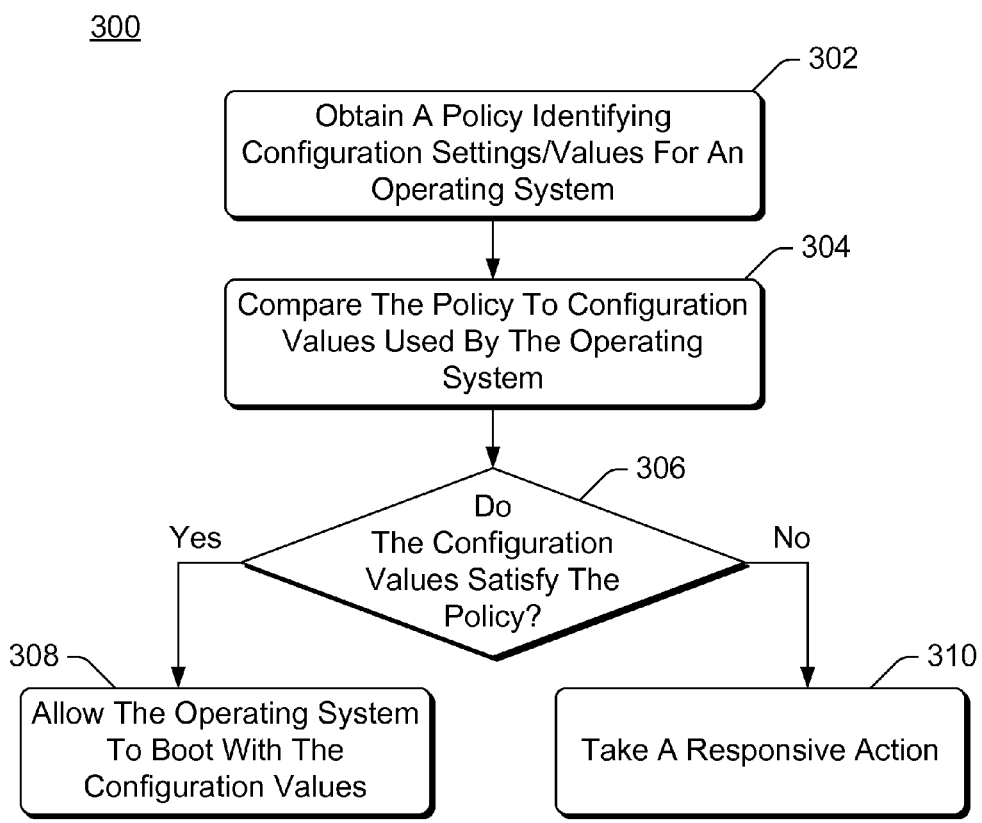
FIG. 3 is a flowchart illustrating an example process for protecting operating system configuration values in accordance with one or more embodiments.

FIG. 3 is a flowchart illustrating an example process 300 for protecting operating system configuration values in accordance with one or more embodiments. Process 300 is carried out by a device, such as device 100 of FIG. 1, and can be implemented in software, firmware, hardware, or combinations thereof. Process 300 is performed as part of a pre-operating system environment on a device prior to running an operating system on the device. Process 300 is shown as a set of acts and is not limited to the order shown for performing the operations of the various acts. Process 300 is an example process for protecting operating system configuration values; additional discussions of protecting operating system configuration values are included herein with reference to different figures.

In process 300, a policy identifying configuration settings and/or values for an operating system is obtained (act 302). The policy can be changed by an operating system loader, but the operating system is prevented from changing the policy as discussed above.

The policy is compared to configuration values used by the operating system (act 304), and a check is made as to whether the configuration values used by the operating system satisfy the policy (act 306). Whether the configuration values used by the operating system satisfy the policy can be determined in a variety of different manners as discussed above.

If the configuration values satisfy the policy, then the operating system is allowed to boot with the configuration values (act 308). However, if the configuration values do not satisfy the policy then a responsive action is taken (act 310). A variety of different responsive actions can be taken as discussed above.

Figure 4:
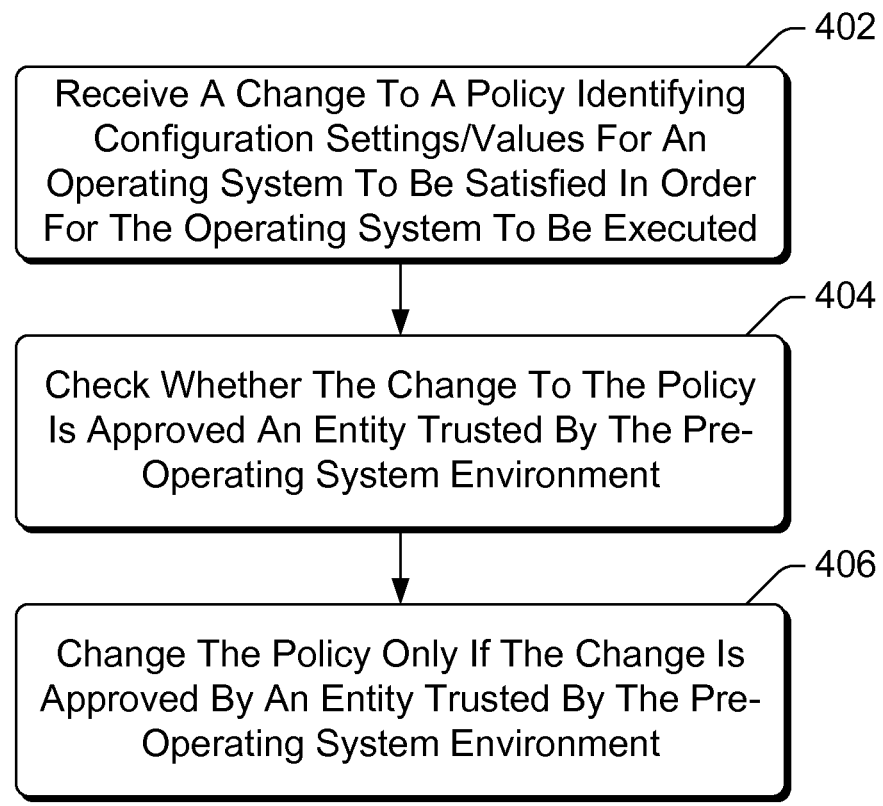
FIG. 4 is a flowchart illustrating an example process for changing policies in a device in accordance with one or more embodiments.

FIG. 4 is a flowchart illustrating an example process 400 for changing policies in a device in accordance with one or more embodiments. Process 400 is carried out by a device, such as device 100 of FIG. 1, and can be implemented in software, firmware, hardware, or combinations thereof. Process 400 is performed as part of a pre-operating system environment on a device prior to running an operating system on the device. Process 400 is shown as a set of acts and is not limited to the order shown for performing the operations of the various acts. Process 400 is an example process for changing policies in a device; additional discussions of changing policies in a device are included herein with reference to different figures.

In process 400, a change to a policy identifying configuration settings and/or values for an operating system that are to be satisfied by configuration values of the operating system in order for the operating system to be executed or run are received (act 402). The operating system is prevented from changing the policy, as discussed above.

A check is made as to whether the change to the policy is approved by a trusted entity (act 404). Such a trusted entity is an entity trusted by the pre-operating system environment (e.g., an operating system loader), and this check can be made by prompting the user to approve the change, or verifying that the change is digitally signed by a trusted entity as discussed above. If the change is not approved by a trusted entity then the policy is not changed. However, if the change is approved by a trusted entity then the policy is changed (act 406) in accordance with the change received in act 402. In addition to the trusted entity approval, various other verifications or checks can also be performed before changing the policy as discussed above, such as checking timestamps, ancestor lists, and so forth.

The protecting operating system configuration values techniques discussed herein support various usage scenarios. For example, operating system configuration values and a policy can indicate that an anti-malware program from one of various manufacturers or developers is to be run on a device, and that the operating system should not be loaded and run on the device unless such an anti-malware program is running on the device. If a malicious program were to attempt to modify the operating system configuration values to indicate that an anti-malware program is not required to be running in order to load and run the operating system, then the next time the device is booted an operating system loader component will detect that the operating system configuration values do not satisfy the policy, and thus does not load and run the operating system without the anti-malware program.

By way of another example, a device can be shipped from a manufacturer or distributor with a default operating system policy. A purchaser of the device can desire to use the device in an enterprise environment (e.g., as part of a corporate or home network), and have an enterprise policy that he or she desires to have used in place of the default operating system policy. This enterprise policy can have different security-related settings and so forth than the default operating system policy, and the enterprise policy has an ancestor list that includes an identifier of the default operating system policy. An administrator of the enterprise environment can be a trusted entity and generate a digital signature over the enterprise policy, which is provided to the operating system loader. As the enterprise policy is signed by a trusted entity, and identifies the default operating system on its ancestor list, the enterprise policy replaces the default operating system policy in the policy record. However, a subsequent default operating system policy would not accidentally replace the enterprise policy because the subsequent default operating system policy would not identify the enterprise policy on its ancestor list.

Figure 5:
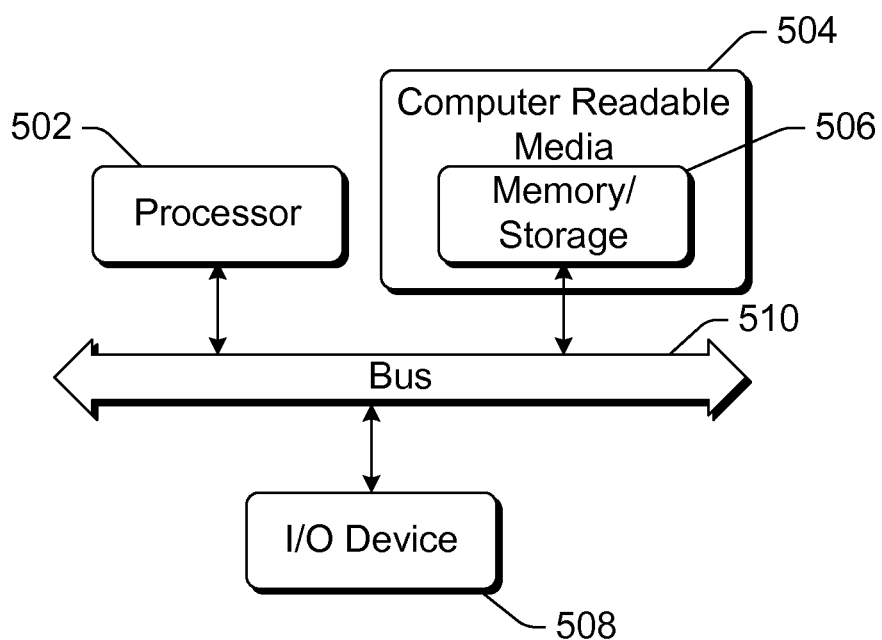
FIG. 5 illustrates an example computing device that can be configured to implement the protecting operating system configuration values in accordance with one or more embodiments.

FIG. 5 illustrates an example computing device 500 that can be configured to implement the protecting operating system configuration values in accordance with one or more embodiments. Computing device 500 can be, for example, device 100 of FIG. 1, or run a virtual machine in which device 100 is implemented.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the protecting operating system configuration values techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
obtaining, in a pre-operating system environment on a device prior to running an operating system on the device, a policy identifying configuration settings for one or more operating systems, a component of the pre-operating system being permitted to change the policy but the operating system being prevented from changing the policy;
comparing, in the pre-operating system environment, the policy to configuration values used by the operating system;
allowing, in the pre-operating system environment, the operating system to boot with the configuration values if the configuration values satisfy the policy;
taking, in the pre-operating system environment, a responsive action if the configuration values do not satisfy the policy, the policy identifying different responsive actions for different configuration values, wherein at least one responsive action is a prompt requesting the user to approve of a current operating system configuration value, the prompt including an indication of what the configuration value should be in order to satisfy the policy; and
performing the obtaining and comparing, as well as the allowing or the taking, each time the device is booted.

2. A method as recited in claim 1, the policy further identifying configuration settings that the pre-operating system environment is to satisfy in order for the operating system to be allowed to boot.

3. A method as recited in claim 1, wherein at least one responsive action is to stop a boot process so that the operating system is not run on the device.

4. A method as recited in claim 1, wherein at least one responsive action is to overwrite one or more of the configuration values with one or more values identified in the policy and allow the operating system to boot with the one or more of the configuration values overwritten with the one or more values identified in the policy.

5. A method as recited in claim 1, wherein at least one responsive action is to report an event that the configuration values did not satisfy the policy and allow the operating system to boot.

6. A method as recited in claim 1, further comprising:
capturing, in the pre-operating system environment, a value for a configuration setting of the policy;
saving the captured value as part of the policy; and
using the captured value as part of the policy settings of the policy for subsequent boots of the device.

7. A method as recited in claim 1, further comprising allowing the policy to be replaced by a new version of the policy only if the new version of the policy is from a policy issuer that is a trusted entity and if the new version of the policy is determined to be a newer version of the policy.

8. A method as recited in claim 7, further comprising determining that the new version of the policy is a newer version of the policy if an identifier of the policy is included in an ancestor list of the new version of the policy.

9. A method as recited in claim 1, further comprising allowing the policy to be replaced by a new version of the policy only if the new version of the policy is from a policy issuer that is a trusted entity, if a policy identifier of the new version of the policy is the same as a policy identifier of the policy, and if a timestamp of the new version of the policy is more recent than a timestamp of the policy.

10. A method as recited in claim 1, wherein the pre-operating system environment is a pre-operating system environment of a virtual machine running on a computing device.

11. A method as recited in claim 1, wherein the policy is maintained in a secure manner in which a component of the pre-operating system environment can change the policy but the operating system is prevented from changing the policy.

12. A method as recited in claim 1, the policy further including a reference to one or more additional policies having configuration settings that are to be included as part of the policy.

13. A method as recited in claim 1, the policy further including an identifier of one or more trusted entities that can be policy issuers of one or more policies identifying configuration settings for the operating system.

14. A method as recited in claim 1, further comprising:
obtaining, in the pre-operating system environment, an additional policy identifying configuration settings of the operating system, the operating system being prevented from changing the additional policy; and
wherein the comparing comprises comparing both the policy and the additional policy to configuration values used by the operating system, wherein the allowing comprises allowing the operating system to boot with the configuration values only if the configuration values satisfy both the policy and the additional policy, and wherein the taking comprises taking a responsive action if the configuration values do not satisfy one or both of the policy and the additional policy.

15. A method implemented in a pre-operating system environment of a device, the method comprising:
receiving a change to a policy identifying configuration settings that are to be satisfied by configuration values of the operating system in order for the operating system to be executed on the device, the operating system being prevented from changing the policy, the policy further identifying particular responsive actions for particular configuration values in response to the configuration values not satisfying the policy, with two or more different configuration values having different responsive actions, wherein at least one of the responsive actions is a prompt requesting the user to approve of a current operating system configuration value, the prompt including an indication of what the configuration value should be in order to satisfy the policy;
checking, at the device, whether the change to the policy is approved by an entity trusted by the pre-operating system environment; and
changing the policy only if the change to the policy is approved by the entity trusted by the pre-operating system environment.

16. A method as recited in claim 15, wherein the entity trusted by the pre-operating system environment comprises a user of the device.

17. A method as recited in claim 15, wherein the policy is maintained in a secure manner that is inaccessible to the operating system.

18. A method as recited in claim 17, wherein the secure manner comprises maintaining the policy as a Unified Extensible Firmware Interface (UEFI) boot service access variable.

19. One or more computer storage media having stored thereon multiple instructions that, when executed by one or more processors, cause the one or more processors to perform acts comprising:
   obtaining, in a pre-operating system environment on a device prior to loading and running an operating system on the device, a policy identifying configuration settings for one or more operating systems, the policy being stored in a secure manner allowing the policy to be changed by one or more components in the pre-operating system environment but preventing the policy from being changed by the operating system, the one or more components in the pre-operating system environment allowing a change to be made to the policy only if the change is approved by a user of the device;
   comparing, in the pre-operating system environment, the policy to configuration values used by the operating system;
   checking, in the pre-operating system environment, whether the configuration values used by the operating system satisfy the policy;
   allowing, in the pre-operating system environment, the operating system to boot with the configuration values if the configuration values satisfy the policy;
   taking, in the pre-operating system environment, a responsive action if the configuration values do not satisfy the policy, the policy identifying particular responsive actions for particular configuration values, and at least one of the particular responsive actions being different from another of the particular responsive actions; and
performing the obtaining, the comparing, and the checking, as well as the allowing or the taking, each time the device is booted.

20. One or more computer storage media as recited in claim 19, the acts further comprising allowing the policy to be replaced by a new version of the policy only if the new version of the policy is from a policy issuer that is a trusted entity and if the new version of the policy is determined to be a newer version of the policy.

21. A device comprising:
   one or more computer storage memories having stored thereon firmware to initiate execution of an operating system loader, the firmware and the operating system loader both being implemented in a pre-operating system environment on the device prior to running an operating system on the device; and
   the operating system loader to:
      obtain, in the pre-operating system environment, a policy identifying configuration settings for one or more operating systems, a component of the pre-operating system being permitted to change the policy but the operating system being prevented from changing the policy;
      compare, in the pre-operating system environment, the policy to configuration values used by the operating system;
      allow, in the pre-operating system environment, the operating system to boot with the configuration values if the configuration values satisfy the policy;
      take, in the pre-operating system environment, a responsive action if the configuration values do not satisfy the policy, the policy identifying different responsive actions for different configuration values, wherein at least one responsive action is a prompt requesting the user to approve of a current operating system configuration value, the prompt including an indication of what the configuration value should be in order to satisfy the policy; and
      perform the obtaining and comparing, as well as the allowing or the taking, each time the device is booted.

22. A device as recited in claim 21, the policy further identifying configuration settings that the pre-operating system environment is to satisfy in order for the operating system to be allowed to boot.

23. A device as recited in claim 21, the operating system loader further to:
   capture, in the pre-operating system environment, a value for a configuration setting of the policy;
   save the captured value as part of the policy; and
   use the captured value as part of the policy settings of the policy for subsequent boots of the device.

24. A device comprising:
one or more hardware processors; and
one or more computer storage memories having stored thereon multiple instructions that, responsive to execution by the one or more processors, cause the one or more processors to, in a pre-operating system environment of the device:
   receive a change to a policy identifying configuration settings that are to be satisfied by configuration values of the operating system in order for the operating system to be executed on the device, the operating system being prevented from changing the policy, the policy further identifying particular responsive actions for particular configuration values in response to the configuration values not satisfying the policy, with two or more different configuration values having different responsive actions, wherein at least one of the responsive actions is a prompt requesting the user to approve of a current operating system configuration value, the prompt including an indication of what the configuration value should be in order to satisfy the policy;
   check, at the device, whether the change to the policy is approved by an entity trusted by the pre-operating system environment; and
   change the policy only if the change to the policy is approved by the entity trusted by the pre-operating system environment.

25. A device as recited in claim 24, wherein the policy is maintained in a secure manner that is inaccessible to the operating system.

26. A device as recited in claim 25, wherein the secure manner comprises maintaining the policy as a Unified Extensible Firmware Interface (UEFI) boot service access variable.

* * * * *